United States Patent
Berger et al.

(10) Patent No.: US 11,444,720 B2
(45) Date of Patent: Sep. 13, 2022

(54) WIRELESS DEVICE TRANSMIT AND RECEIVE CAPABILITY IN SIDELINK CONTROL INFORMATION

(71) Applicant: QUALCOMM Incorporated, San Diego, CA (US)

(72) Inventors: Peer Berger, Hod Hasharon (IL); Shay Landis, Hod Hasharon (IL); Lior Uziel, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 16/843,804

(22) Filed: Apr. 8, 2020

(65) Prior Publication Data

US 2021/0320746 A1 Oct. 14, 2021

(51) Int. Cl.
*H04W 4/00* (2018.01)
*H04L 1/00* (2006.01)
*H04L 5/00* (2006.01)

(52) U.S. Cl.
CPC .......... *H04L 1/0003* (2013.01); *H04L 1/0009* (2013.01); *H04L 1/0025* (2013.01); *H04L 5/0053* (2013.01)

(58) Field of Classification Search
CPC ... H04L 1/0003; H04L 1/0009; H04L 1/0025; H04L 5/0053; H04W 72/02
USPC .......................................... 370/329; 375/377
See application file for complete search history.

(56) References Cited

U.S. PATENT DOCUMENTS 10,057,935 B2 * 8/2018 Sartori ............. H04W 72/0406
10,863,492 B2 * 12/2020 Patel .................... H04W 76/14
2016/0066337 A1 * 3/2016 Sartori ............. H04W 72/0406
370/329
2017/0079035 A1 * 3/2017 Seo .................... H04W 72/0453
2018/0092067 A1 * 3/2018 Liu ....................... H04W 72/048
(Continued)

FOREIGN PATENT DOCUMENTS

EP 3681247 A1 7/2020
WO WO-2019049348 A1 3/2019

OTHER PUBLICATIONS

Mathworks, "Device-to-Device (D2D) Communication for Public Safety in LTE" MathWorks, 10 pages, date retrieived on Jul. 2, 2021.*

(Continued)

*Primary Examiner* — Syed Haider

(74) *Attorney, Agent, or Firm* — Holland & Hart LLP

(57) ABSTRACT

Methods, systems, and devices for wireless communications are described. One or more UEs communicating over sidelink may indicate transmit and receive categories to other UEs. A first UE may receive, in a sidelink communication message, an indication of a receive category of a second wireless device. The first UE may then transmit a shared sidelink channel message to the second wireless device based on the receive category of the second wireless device. In another case, a first UE may receive, in a sidelink communication message, an indication of a transmit category of a second wireless device. The first wireless device may then compare the transmit category of the second wireless device with a receive category of the first wireless device. The first wireless device may determine whether to decode a shared sidelink channel message from the second UE based on the comparing.

27 Claims, 11 Drawing Sheets

(56) References Cited

U.S. PATENT DOCUMENTS

| | | | | |
|---|---|---|---|---|
| 2018/0242228 | A1* | 8/2018 | Jung | H04W 8/24 |
| 2019/0045465 | A1* | 2/2019 | Lee | H04W 92/18 |
| 2019/0052436 | A1* | 2/2019 | Desai | H04L 1/1861 |
| 2019/0182859 | A1* | 6/2019 | Khoryaev | H04L 1/0013 |
| 2019/0342910 | A1* | 11/2019 | Cao | H04W 4/40 |
| 2019/0356451 | A1* | 11/2019 | Zhang | H04B 17/327 |
| 2020/0029318 | A1* | 1/2020 | Guo | H04W 4/40 |
| 2020/0053528 | A1 | 2/2020 | Wang et al. | |
| 2020/0314939 | A1* | 10/2020 | Park | H04W 72/12 |
| 2020/0322924 | A1* | 10/2020 | Kim | H04L 1/0003 |
| 2021/0051653 | A1* | 2/2021 | Park | H04W 72/0413 |

OTHER PUBLICATIONS

Mehdi Harounabad et al., "V2X in 3GPP Standardization: NR Sidelink in Rel-16 and Beyond", IEEE Communication Standards Magazine, Mar. 2021, pp. 1-10.*

3GPP Ts 38.331: "3rd Generation Partnership Project; Technical Specification Group Radio Access Network; NR; Radio Resource Control (RRC) Protocol specification (Release 16)", 3GPP TS 38.331 V16.0.0 (Mar. 2020), Apr. 6, 2020 (Apr. 6, 2020), 3GPP Standard, Technical Specification, 3GPP TS 38.331, 3rd Generation Partnership Project (3GPP), Mobile Competence Centre, 650, Route Des Lucioles, F-06921 Sophia-Antipolis Cedex, France, vol. RAN WG2, No. V16.0.0, Apr. 6, 2020 (Apr. 6, 2020), pp. 1-832, XP051893854, Retrieved from the Internet: URL: ftp://ftp.3gpp.org/Specs/archive/38_series/38.331/38331-g00.zip 38331-g00.docx [retrieved on Apr. 6, 2020] Paragraph [0735].section 5.5.1.

Catt: "Discovery Procedure and Connection Setup Procedure in NR Sidelink", 3GPP Draft, R2-1816898, 3GPP TSG-RAN WG2 Meeting #104, 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 12, 2018 (Nov. 12, 2018), XP051556461, 3 Pages, Retrieved from the Internet: URL:http://www.3gpp.org/ftp/Meetings%5F3GPP%5FSYNC/RAN2/Docs/R2%2D1816898%2Ezip [retrieved on Nov. 12, 2018] Section 2.2.

Intel Corporation: "UE Capabilities for LTE Rel.15 V2X Communication", 3GPP Draft, 3GPP TSG RAN WG1 Meeting #93, R1-1806486—INTEL—V2X_Capability, 3rd Generation Partnership Project (3GPP), Mobile Competence Centre, 650, Route Des Lucioles, F-06921, Sophia-Antipolis Cedex, France, vol. RAN WG1, No. Busan, Korea, May 21, 2018-May 25, 2018, May 20, 2018 (May 20, 2018), XP051441688, XP051462546, pp. 1-5, Retrieved from the Internet: URL: http://www.3gpp.org/ftp/Meetings%5F3GPP%5FSYNC/RAN1/Docs/, http://www.3gpp.org/ftp/Meetings%5F3GPP%5FSYNC/RAN1/Docs/ [retrieved on May 20, 2018] Section 5, the whole document.

International Search Report and Written Opinion—PCT/US2021/025365—ISA/EPO—dated Jul. 14, 2021.

ZTE Corporation, et al., "Consideration on PC5 RRC Procedures for Unicast", 3GPP Draft, R2-1903623, 3GPP TSG RAN WG2 Meeting #105bis, Consideration on PC5 RRC Procedures for Unicast, 3rd Generation Partnership Project (3GPP), Mobile Competence Centre, 650, Route Des Lucioles, F-06921 Sophia-Antipolis Cedex, vol. RAN WG2, No. Xi'an, China, Apr. 8, 2019-Apr. 12, 2019, Apr. 6, 2019 (Apr. 6, 2019), XP051700965, 4 Pages, Retrieved from the Internet: URL:http://www.3gpp.org/ftp/Meetings%5F3GPP%5FSYNC/RAN2/Docs/R2%2D1903623%2Ezip [retrieved on Apr. 6, 2019] Section 2.2, p. 2.

* cited by examiner

WIRELESS DEVICE TRANSMIT AND RECEIVE CAPABILITY IN SIDELINK CONTROL INFORMATION

FIELD OF TECHNOLOGY

The following relates generally to wireless communications and more specifically to wireless device transmit and receive capability in sidelink control information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

One or more UEs may communicate in a wireless communications systems using sidelink channels. Each UE may have a corresponding transmit category indicating transmit capabilities of the UE, and a receive category, indicating receive capabilities of the UE. However, a UE may not be aware of the transmit or receive categories of other UEs that the UE communicates with, which may cause communication disruptions or delays.

SUMMARY

The described techniques relate to improved methods, systems, devices, and apparatuses that support wireless device transmit and receive capability in sidelink control information. Generally, the described techniques provide for one or more user equipments (UEs) communicating over sidelink and indicating transmit and receive categories to other UEs. In a first case, a first UE may receive, in a sidelink communication message, an indication of a receive category of a second wireless device. The first UE may then transmit a shared sidelink channel message to the second wireless device based on the receive category of the second wireless device. In another case, a first UE may receive, in a sidelink communication message, an indication of a transmit category of a second wireless device. The first wireless device may then compare the transmit category of the second wireless device with a receive category of the first wireless device. The first wireless device may determine whether to decode a shared sidelink channel message from the second UE based on the comparing.

DETAILED DESCRIPTION

Figure 1:
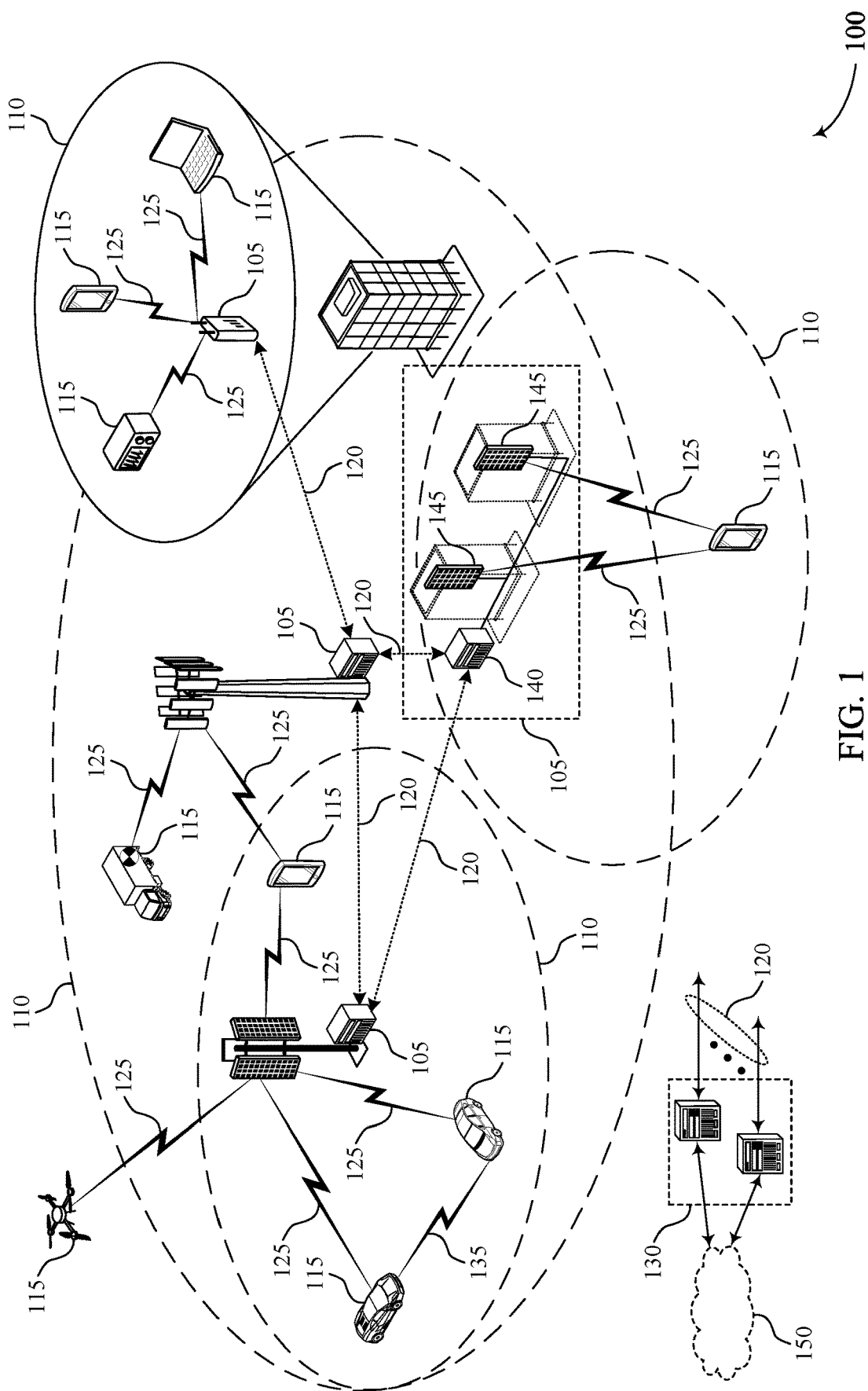
FIG. 1 illustrates an example of a wireless communications system that supports wireless device transmit and receive capability in sidelink control information in accordance with aspects of the present disclosure.

In some wireless communications systems, two or more devices may communicate through device-to-device communication, such as vehicle-to-vehicle (V2V) or vehicle-to-everything (V2X) communications systems. In a V2X system, a user equipment (UE) may communicate over a sidelink channel to other UEs. A UE may transmit or receive sidelink control information (SCI) in the sidelink channel (e.g., in a physical sidelink control channel (PSCCH)). The UE may also transmit or receive sidelink data and signaling information in the sidelink channel, such as in a physical sidelink shared channel (PSSCH).

A UE may have particular transmission and reception capabilities that may determine which types of control and data messages the UE may be capable of receiving and transmitting.

A UE may transmit sidelink message to other UEs over a sidelink channel. In some cases, there may be mismatch between the transmission capabilities of the transmitting UE and the reception capabilities of the receiving UE. In some cases, this mismatch of transmission and reception parameters may prevent the receiving UE from successfully decoding the transmission. In some cases, this mismatch of transmission and reception parameters may cause the receiving UE to expend additional time and computational resources to decode the transmission, although the UE may not be able to decode the transmission due to the capability mismatch.

In some cases, a sidelink communication may occur where the transmission capabilities of the transmitting UE may exceed the reception capabilities of the receiving UE. In this case, the transmitting UE may transmit a message that the receiving UE may not be able to decode. This may prevent communication between the transmitting UE and the receiving UE. Additionally, the receiving UE may expend resources trying to decode a transmission that it is not capable of decoding.

In some cases, a sidelink communication may occur where the reception capabilities of the receiving UE may equal or exceed the transmission capabilities of the transmitting UE. In this case, the receiving UE may decode the message from the transmitting UE. In some cases where the reception capabilities of the receiving UE exceed the transmission capabilities of the transmitting UE, the receiving UE may determine a subset of parameters used to send the transmission in order to decode the message. This determination may require iterating over possible transmission parameters or combinations of transmission parameters to decode the message.

A UE may be configured with a transmit category that indicates parameters for a number of transmission capabilities of the UE. The parameters that may be indicated by the transmit category include at least one of a maximum number of sidelink shared channel transport block bits that may be transmitted within a transmission time interval (TTI), a maximum number of bits of a sidelink shared channel transport block that may be transmitted within a TTI, and a maximum number of support layers for spatial multiplexing in the sidelink transmit category.

In some cases, the UE may be configured with a receive category that indicates parameters for a number of reception capabilities of the UE. The parameters that may be indicated by the receive category include at least one of a maximum number of sidelink shared channel transport block bits received within a TTI, a maximum number of bits of a sidelink shared channel transport block received within a TTI a total number of soft channel bits that may be transmitted in a TTI.

In order to increase efficiency in sidelink communications systems, UEs may transmit (e.g., in a broadcast message) and indication of a transmit capability, or receive capability of the UE, or both.

A UE may receive the indication of the transmit or receive capability of another UE and may determine a transmission or reception strategy based on the capabilities. In one case, a UE reception a sidelink channel message from another UE may use the transmit category from the transmitting UE to determine whether to decode the transmission. For example, the receiving UE may determine that a transmission parameter indicated by the transmit capability is less than a reception parameter indicated by the receive capability of the receiving UE. Thus, the UE may determine to decode the transmission. Alternatively, the receiving UE may determine that a transmission parameter indicated by the transmit capability is greater than a reception parameter indicated by the receive capability of the receiving UE. Thus, the UE may determine not to decode the transmission, and may not spend energy and resources attempting to decode the message.

In other cases, the transmitting UE may use the receive category from the receiving UE to format transmissions to support reception of the transmission by the receiving UE. In the example where the parameters indicating the transmission capabilities of the transmitting UE exceed the parameters indicating the reception capabilities of the receiving UE, the transmitting UE may modify the transmission to enable decoding by the receiving UE based at least in part on the receive category of the receiving UE. For example, the transmitting UE may determine a segmentation, a modulation and coding scheme (MCS), and resource block configuration of the transmitted sidelink message that the receiving UE may be able to receive.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to wireless device transmit and receive capability in sidelink control information.

FIG. 1 illustrates an example of a wireless communications system 100 that supports wireless device transmit and receive capability in sidelink control information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may participate in a device-to-device communication with one or more other UEs 115. A first UE 115 may broadcast an indication of the transmit and receive capabilities of the first UE 115 as transmit and receive categories. This indication may be transmitted in SCI communications between UEs 115. A second UE 115 may also broadcast indication of the transmission and reception capabilities of the second UE 115 as transmit and receive categories as part of the SCI. In a first case, the first UE 115 may use the receive category of the second UE 115 to determine how to format a transmission to the second UE 115, such that the second UE 115 may decode the transmission. In another case, a first UE may use the transmit category of a second UE 115 to determine whether to decode a transmission from the second UE 115. For example, the second UE may determine that the transmit category of the first UE 115 indicates transmission capabilities that are greater than the receive capabilities of the first UE 115 (e.g., based on the receive category of the first UE 115). For example, the first UE 115 may determine that the second UE may transmit more transport block bits within a sidelink channel than the first UE is capable of receiving within a TTI. Thus, the first UE 115 may determine not to decode a transmission from the second UE.

Figure 2:
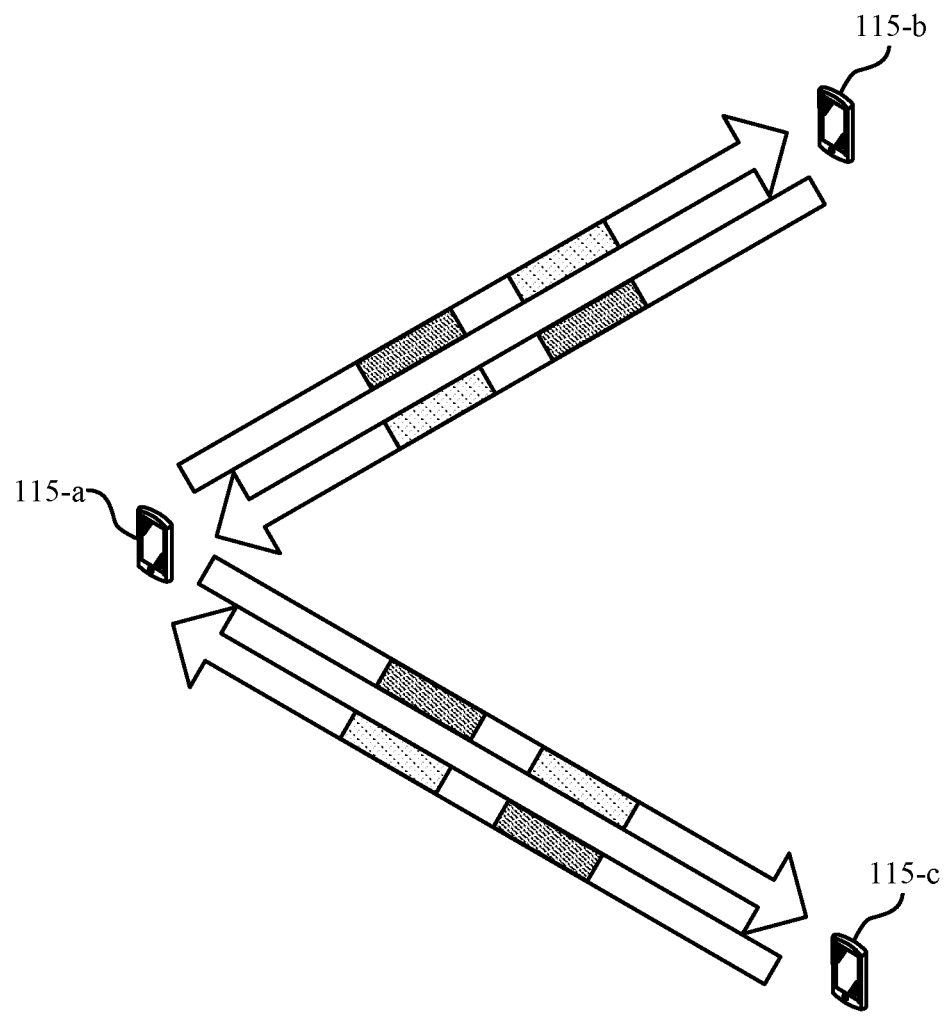
FIG. 2 illustrates an example of a wireless communications system that supports wireless device transmit and receive capability in sidelink control information in accordance with aspects of the present disclosure.

FIG. 2 illustrates an example of a wireless communications system 200 that supports wireless device transmit and receive capability in sidelink control information in accordance with aspects of the present disclosure. In some examples, wireless communications system 200 may implement aspects of wireless communication system 100. Wireless communications system 200 may include UE 115-a, UE 115-b, and UE 115-c, which may be examples of the corresponding UEs 115 as described with reference to FIG. 1.

UE 115-a may communicate over sidelink channels with one or more other UEs, such as UE 115-b or UE 115-c, or both. UE 115-a may communicate based on a transmit category and a receive category. The transmit category may indicate a set of transmission capabilities including at least one of a maximum number of sidelink shared channel transport block bits that may be transmitted within a TTI, a maximum number of bits of a sidelink shared channel transport block that may be transmitted within a TTI, and a maximum number of support layers for spatial multiplexing in the sidelink transmit category. The receive category may indicate a set of reception capabilities including at least one of a maximum number of sidelink shared channel transport block bits received within a TTI, a maximum number of bits of a sidelink shared channel transport block received within a TTI, and a total number of soft channel bits that may be received in a TTI.

UE 115-a may broadcast the transmit category indication 205, receive category indication 210, or both of UE 115-a for use by UE 115-b and UE 115-c in the sidelink communications system. The transmit category indication 205 and receive category indication 210 may be transmitted as part of the SCI. The SCI may be transmitted in a PSCCH. The transmit category and receive category may be information bits added to the SCI.

Other information may also be deduced by a UE 115 based on the transmit category or receive category of another UE 115. Further, the category of a UE 115 may be updated by control information from the network. For example, a UE 115 communicating in a non-V2X system may have a category that indicates different communication parameters for non-V2X communications, or may be configured with a different category for non-V2X communications. The transmit or receive category of the UE 115 may also vary or indicate different parameters based on the radio access technology (RAT) (e.g., LTE or NR) that the UE 115 may be configured to operate according to. This may be an example of a variable transmit category or receive category.

In some examples, the number of information bits used to communicate the transmit category indication 205 and receive category indication 210 may correspond to the number possible transmit categories and receive categories. For example, there may be five possible transmit categories, and three information bits (e.g., based on the number of binary bits to express five different numbers) may be used to communicate the transmit category indication 205. In another example, there may be four possible receive categories, and two information bits (e.g., based on the number of binary bits to express four numbers) may be used to communicate the receive category indication 210. In the example where three bits may be used to communicate the transmit category indication 205 and two bits may be used to communicate the receive category indication 210, a total of five bits may be added to the SCI to represent the transmission and reception capabilities of the UE 115. In other examples, a different of information bits may be added to the SCI to represent the transmit category indication 205 and receive category indication 210, based on the number of possible transmit and receive categories.

UE 115-*b* may also broadcast the transmit category indication 205, receive category indication 210, or both of UE 115-*b* for use by UE 115-*a* and UE 115-*c*. The transmit category indication 205 and receive category indication 210 may be transmitted as part of the SCI. The SCI may be transmitted in the PSCCH. The transmit category and receive category may be information bits added to the SCI.

UE 115-*a* and UE 115-*b* may also be capable of receiving and using the transmit category indication 205 and the receive category indication 210 sent from another UE 115. UE 115-*a* and UE 115-*b* may be capable of modifying transmissions or informing decoding methods based at least in part on the transmit category indication 205 or receive category indication 210 for the other devices in the sidelink communication.

In some examples, UE 115-*a* may transmit a message to UE 115-*b* through sidelink communication. Prior to the transmission, UE 115-*a* may broadcast SCI in a PSCCH that includes the transmit category indication 205 and receive category indication 210 for UE 115-*a*. UE 115-*b* may also broadcast SCI in a PSCCH that includes the transmit category indication 205 and receive category indication 210 for UE 115-*b*. UE 115-*a* may receive the transmit category indication 205 and receive category indication 210 of UE 115-*b* and UE 115-*b* may receive the transmit category indication 205 and receive category indication 210 of UE 115-*a*.

In some examples, sidelink transmit categories may correspond with physical transmission capabilities of a UE 115 as shown in Table 1.

exist with different corresponding capabilities, or the categories shown herein may have different corresponding capabilities in different cases.

In some cases, UE 115-*a* may determine whether the parameters identifying the reception capabilities of UE 115-*b* are less than, greater than, or equal to, the parameters identifying the transmission capabilities of UE 115-*a* by comparing the transmit category indication 205 of UE 115-*a* to the receive category indication 210 of UE 115-*b*. Based on this determination, UE 115-*a* may format a PSSCH transmission to be compatible with the reception capabilities of UE 115-*b*.

For example, UE 115-*a* may be transmit category 4 and UE 115-*b* may be receive category 2 as defined in Table 1 and Table 2. UE 115-*a* may initiate communication over a sidelink channel with UE 115-*b*. For UE 115-*a*, the transmission parameters of the maximum number of sidelink shared channel transport block bits that may be transmitted within a TTI and the maximum number of bits of a sidelink shared channel transport block that may be transmitted within a TTI both exceed the associated reception parameters of the maximum number of sidelink shared channel transport block bits received within a TTI and the maximum number of bits of a sidelink shared channel transport block received within a TTI for UE 115-*b*. Based on the determination that the reception capability parameters indicated by receive category indication 210 of UE 115-*b* are less than the transmission capability parameters indicated by the transmit category indication 205 of UE 115-*a*, UE 115-*a* may modify the PSSCH transmission to be compatible with the reception

TABLE 1

| UE Sidelink Transmit Category | Maximum number of Sidelink Shared Channel Transport Block Bits transmitted within a TTI | Maximum Number of bits of a Sidelink Shared Channel transport block transmitted within a TTI | Maximum Number of Supported Layers for Spatial Multiplexing in the Sidelink Transmit Category |
|---|---|---|---|
| Category 1 | 25456 | 25456 | 1 |
| Category 2 | 31704 | 31704 | 1 |
| Category 3 | 49272 | 32856 | 1 |
| Category 4 | 48936 | 48936 | 1 |
| Category 5 | 73488 | 48936 | 1 |

These illustrate example categories and corresponding transport bit and layer numbers, but other categories may exist with different corresponding capabilities, or the categories shown herein may have different corresponding capabilities in different cases.

In some examples, sidelink receive categories may correspond with physical transmission capabilities of the UE as shown in Table 2.

TABLE 2

| UE Sidelink Receive Category | Maximum number of Sidelink Shared Channel Transport Block Bits received within a TTI | Maximum Number of bits of a Sidelink Shared Channel transport block received within a TTI | Total Number of Soft Channel Bits |
|---|---|---|---|
| Category 1 | 25456 | 25456 | |
| Category 2 | 31704 | 31704 | 737280 |
| Category 3 | 48936 | 48936 | 995328 |
| Category 4 | 73488 | 48936 | 1492992 |

These illustrate example categories and corresponding transport bit and soft channel bits, but other categories may capabilities of UE 115-*b*. UE 115-*a* may modify the segmentation type, MCS, or resource block configuration, or a combination of these, such that UE 115-*b* may be able to decode the PSSCH transmission. Thus, UEs 115 may improve communications efficiency In some examples, a receiving UE 115 capability to decode a message may correspond to the receive category of the receiving UE 115 and the transmit category of the transmitting UE 115 as shown in Table 3

TABLE 3

| UE Receive Category | Capable of Decoding Transmit Category |
|---|---|
| 1 | 1 |
| 2 | 1, 2 |
| 3 | 1, 2, 3, and 4 |
| 4 | 1, 2, 3, 4, and 5 |

In some cases, UE 115-*b* may determine that the transmission capabilities of UE 115-*a* are less than the reception capabilities of UE 115-*b* by comparing the transmit category indication 205 of UE 115-*a* to the receive category indication 210 of UE 115-*a* as shown in Table 3. Based on this determination, UE 115-*b* may use the transmit category indication 205 from UE 115-*a* to inform decoding the PSSCH transmitted from UE 115-*a*.

For example, UE 115-*a* may be transmit category 2 and UE 115-*b* may be receive category 3 as defined in Table 1 and Table 2. UE 115-*a* may initiate communication over a sidelink channel with UE 115-*b*. For UE 115-*a*, the transmission parameters of the maximum number of sidelink shared channel transport block bits that may be transmitted within a TTI and the maximum number of bits of a sidelink shared channel transport block that may be transmitted within a TTI both are less than the associated reception parameters of the maximum number of sidelink shared channel transport block bits received within a TTI and the maximum number of bits of a sidelink shared channel transport block received within a TTI for UE 115-*b*. Based on the determination that the reception capability parameters indicated by receive category indication 210 of UE 115-*b* exceed than the transmission capability parameters of UE 115-*a*, UE 115-*a* may transmit the PSSCH transmission to UE 115-*b* without modification to ensure compatible with the reception capabilities of UE 115-*b*. UE 115-*b* may decode the PSSCH transmission from UE 115-*a* using the transmit category indication 205 of UE 115-*a* to inform the decoding method.

Thus, UE 115-*b* my be able to decode the PSSCH transmission, which may also improve other aspects of communications reliability. For example, a decoded message may influence other communication mechanisms such as reference signal received power (RSRP) exclusion, and code rate (CR) limit (e.g., based on a priority of received message). RSRP exclusion may include a UE 115 measuring signal power from a specific sector or direction (e.g., based on decoding a message from that sector or direction) while also excluding nose and interference from other sectors or direction. Thus, UE 115-*b* would not be able to use the message for system level mechanisms (such as RSRP exclusion and CR limit), in cases where UE 115-*b* is not able to decode a message.

In another example, UE 115-*a* may be transmit category 4 and UE 115-*b* may be receive category 3. For UE 115-*a*, the transmission parameters of the maximum number of sidelink shared channel transport block bits that may be transmitted within a TTI and the maximum number of bits of a sidelink shared channel transport block that may be transmitted within a TTI both exceed the associated reception parameters of the maximum number of sidelink shared channel transport block bits received within a TTI and the maximum number of bits of a sidelink shared channel transport block received within a TTI for UE 115-*b*. Based on the determination that the reception capability parameters indicated by receive category indication 210 of UE 115-*b* are less one or more of the transmission capability parameters of UE 115-*a*, UE 115-*b* may receive the PSSCH transmission from UE 115-*a*. UE 115-*b* may determine to refrain from decoding the PSSCH transmission from UE 115-*a*. Thus, UE 115-*b* may save energy and improve communications efficiency.

Figure 3:
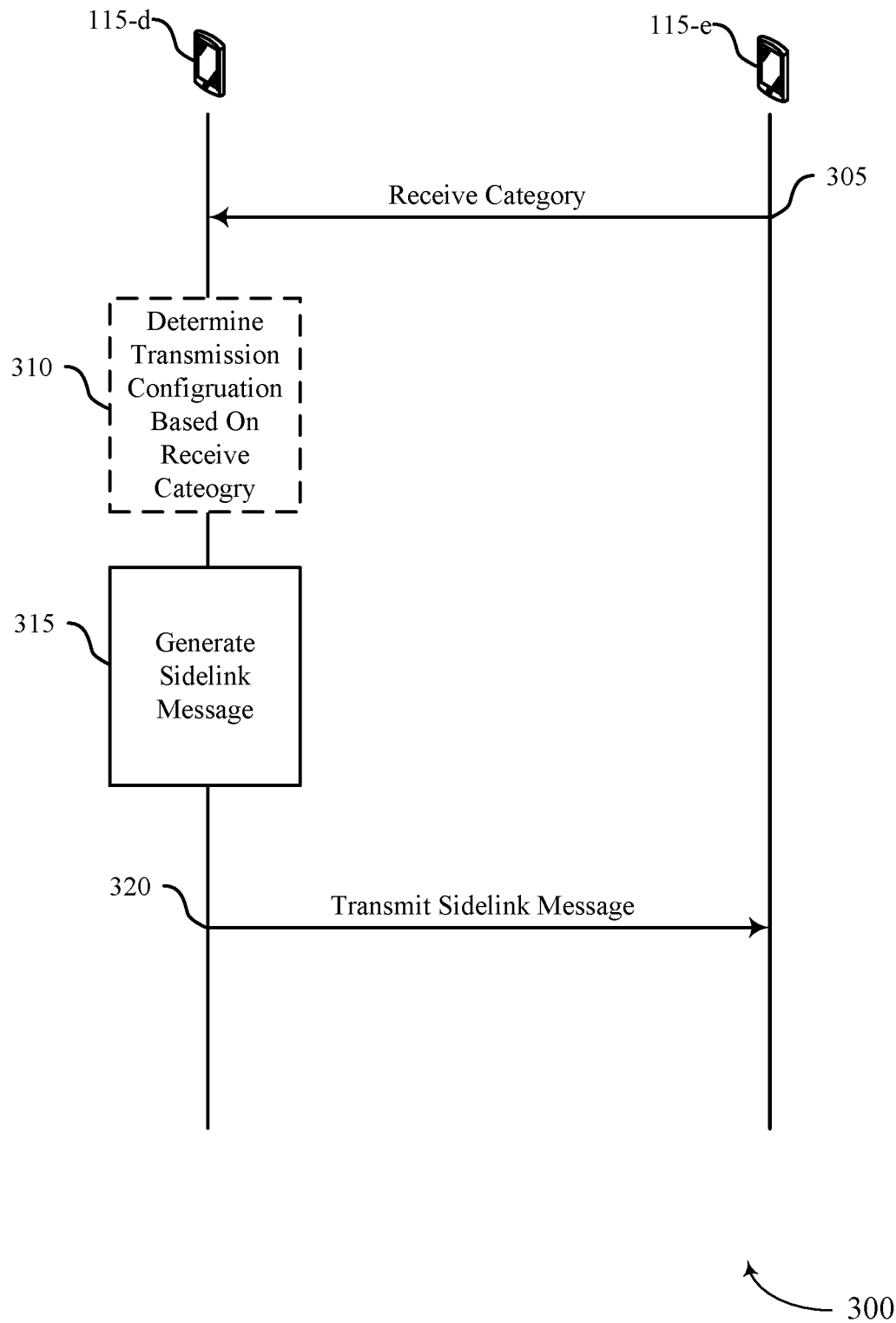
FIG. 3 illustrates an example of a process flow that supports wireless device transmit and receive capability in sidelink control information in accordance with aspects of the present disclosure.

FIG. 3 illustrates an example of a process flow 300 that supports wireless device transmit and receive capability in sidelink control information in accordance with aspects of the present disclosure. In some examples, process flow 300 may implement aspects of wireless communication system 100. UE 115-*d* and UE 115-*e* may be examples of a UE 115 as described with reference to FIGS. 1 and 2. Process flow 300 illustrates an example of a process by which UE 115-*d* may transmit a message via sidelink communications to UE 115-*e*.

At 305, UE 115-*d* may receive, in a sidelink communication message, and indication of a receive category of UE 115-*e*. The receive category may indicate one or more receive parameters of UE 115-*e*. In some examples, the receive parameter may be a number of bits that UE 115-*d* is capable of receiving within a TTI, where the number of bits is a number of sidelink shared channel transport block bits or a number bits of a sidelink shared channel transport block. In some examples, the receive parameter may be a number of supported soft channel bits. In some examples, the receive category may be transmitted by UE 115-*e* in a PSCCH. In some examples, the receive category may be transmitted by UE 115-*e* in a SCI message. In some examples, the sidelink communication message may be a broadcast message.

In some cases, at 310, UE 115-*d* may determine a segmentation, a MCS, and a resource block configuration to be used to transmit a message to UE 115-*e* based at least in part on the receive category of UE 115-*e*. In some examples, a segmentation, a MCS, and a resource block configuration may be determined that do not exceed the receive parameters indicated by the receive category of the second wireless device. In some examples, a segmentation, a MCS, and a resource block configuration may be determined based on an algorithm, where the algorithm is based on the receive category UE 115-*e*. The algorithm may be based on a calculation of throughput or latency, such that a segmentation, a MCS, and a resource block configuration are selected for to increase throughput or decrease latency, or both.

In some cases, at 315, UE 115-*d* may generate a shared sidelink channel message based on the segmentation, the MCS, and the resource block configuration determined at 310.

At 320, UE 115-*d* may transmit a shared sidelink channel message to UE 115-*e* based at least in part on the receive category of UE 115-*e*. In some cases, UE 115-*d* may transmit the shared sidelink channel message generated at 315. UE 115-*d* may transmit the shared sidelink channel message based on the determined segmentation, the MCS, and the resource block configuration.

Figure 4:
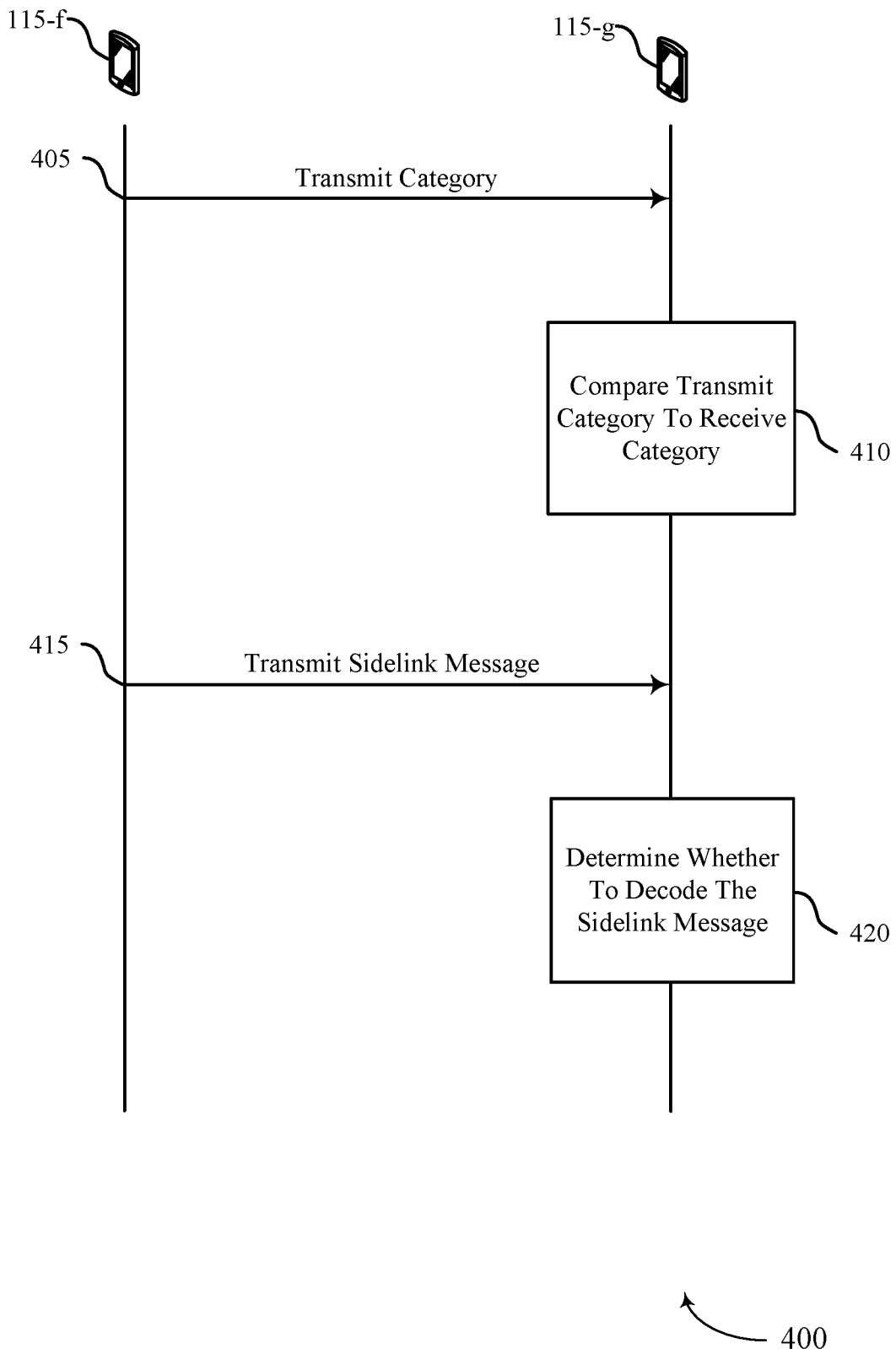
FIG. 4 illustrates an example of a process flow that supports wireless device transmit and receive capability in sidelink control information in accordance with aspects of the present disclosure.

FIG. 4 illustrates an example of a process flow 400 that supports wireless device transmit and receive capability in sidelink control information in accordance with aspects of the present disclosure. In some examples, process flow 400 may implement aspects of wireless communication system 100. UE 115-*f* and UE 115-*g* may be examples of a UE 115 as described with reference to FIGS. 1 and 2. Process flow 400 illustrates an example of a process by which UE 115-*g* may receive a message via sidelink communications from UE 115-*f*.

At 405, UE 115-*g* may receive, in a sidelink communication message, an indication of a transmit category of UE 115-*f*.

The transmit category received by UE 115-*g* may indicate one or more transmit parameters of UE 115-*f*. In some examples, the transmit parameter may be a number of bits that the first wireless device is capable of transmitting within a TTI. In some examples, the number of bits that the first wireless device is capable of transmitting within a TTI is a number of transport block bits. In some examples, the number of bits that the first wireless device is capable of transmitting within a TTI may be a number of sidelink shared channel transport block bits the second wireless device is capable of transmitting within a transmission time interval or a number of bits of a sidelink shared channel transport block the second wireless device is capable of transmitting within a TTI. In some examples, the transmit parameter may be a number of supported layers for spatial multiplexing by UE 115-*f*. In some examples, the transmit category may be transmitted by UE 115-*f* in a PSCCH. In some examples, the transmit category may be transmitted by UE 115-*f* in a SCI message.

At 410, UE 115-*g* may determine, based on the indication of the transmit category of UE 115-*f*, if a transmit parameter of UE 115-*f* is greater than a corresponding receive parameter of UE 115-*g*, where the receive parameter is based at least in part on a receive category of UE 115-*g*. In some cases, UE 115-*g* may determine that a transmit parameter of UE 115-*f* is greater than a corresponding receive parameter of 115-*g*. In some cases, UE 115-*f* may determine that the transmit parameter of UE 115-*f* is less than or equal to the receive parameter of 115-*g*.

The receive category of UE 115-*g* may indicate one or more receive parameters of UE 115-*g*. In some examples, the receive parameter may be a number of bits that UE 115-*g* is capable of receiving within a TTI. In some examples, the number of bits that UE 115-*g* is capable of receiving within a TTI may be a number of transport block bits. In some examples, the number of bits that UE 115-*g* is capable of receiving within a TTI may be a number of sidelink shared channel transport block bits the first wireless device is capable of receiving within a TTI or a number of bits of a sidelink shared channel transport block the first wireless device is capable of receiving within a TTI. In some examples, the receive parameter may be a number of supported soft channel bits. In some examples, the receive parameter may be a number of supported layers for spatial multiplexing by UE 115-*g*.

At 415, UE 115-*g* may receive a shared sidelink channel message from UE 115-*f*.

At 420, UE 115-*g* may determine whether to decode the shared sidelink channel message transmitted from UE 115-*f* based on the determination at 410. In some cases, UE 115-*g* may determine to refrain from decoding the shared sidelink channel message from 115-*f* based at least in part on determining that one or more transmit parameters of UE 115-*f* is greater than a corresponding one or more receive parameters of UE 115-*g*. In some cases, UE 115-*g* may determine to decode the shared sidelink channel message based at least in part on determining that one or more transmit parameters of UE 115-*f* is lower than or equal to a corresponding one or more receive parameters of UE 115-*g*.

In some examples, UE 115-*g* may determine to decode the shared sidelink channel message from UE 115-*f* based at least in part on the number of sidelink shared channel transport block bits UE 115-*g* is capable of receiving within a TTI and the number of bits of a sidelink shared channel transport block that UE 115-*g* is capable of receiving within a TTI.

Figure 5:
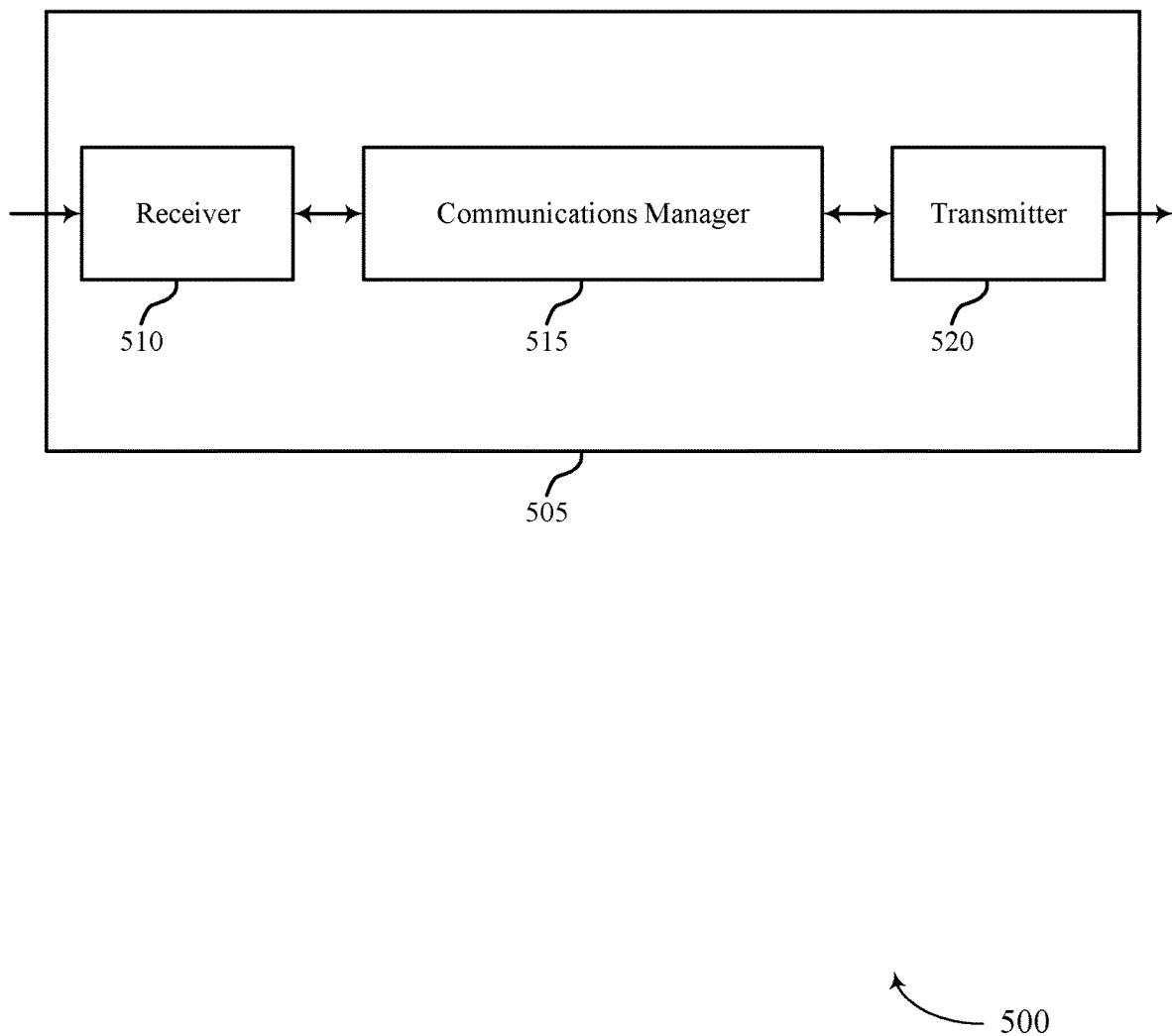
FIGS. 5 and 6 show block diagrams of devices that support wireless device transmit and receive capability in sidelink control information in accordance with aspects of the present disclosure.

FIG. 5 shows a block diagram 500 of a device 505 that supports wireless device transmit and receive capability in sidelink control information in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to wireless device transmit and receive capability in sidelink control information, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, in a sidelink communication message, an indication of a receive category of a second wireless device, the receive category indicating a receive parameter of the second wireless device and transmit a shared sidelink channel message to the second wireless device based on the receive category of the second wireless device. The communications manager 515 may also receive, in a sidelink communication message, an indication of a transmit category of a second wireless device, the transmit category indicating a transmit parameter of the second wireless device, determine, based on the indication, that the transmit parameter of the second wireless device is greater than a receive parameter of the first wireless device, where the receive parameter is based on a receive category of the first wireless device, receive a shared sidelink channel message, and determine to refrain from decoding the shared sidelink channel message based on determining that the transmit parameter of the second wireless device is greater than the receive parameter of the first wireless device. The communications manager 515 may also receive, in a sidelink communication message, an indication of a transmit category of a second wireless device, the transmit category indicating a transmit parameter of the second wireless device, determine, based on the indication, that the transmit parameter of the second wireless device is lower than or equal to a receive parameter of the first wireless device, where the receive parameter is based on a receive category of the first wireless device, receive a shared sidelink channel message, and determine to decode the shared sidelink channel message based on determining that the transmit parameter of the second wireless device is lower than or equal to the receive parameter of the first wireless device. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 described herein may be implemented as a chipset of a wireless modem, and the receiver 510 and the transmitter 520 may be implemented as sets of analog components (e.g., amplifiers, filters, phase shifters, antennas, etc.) The wireless modem may obtain and decode signals from the receiver 510 over a receive interface, and may output signals for transmission to the transmitter 520 over a transmit interface.

The actions performed by communication manager 515 as described herein may be implemented to realize one or more potential advantages. One implementation may allow a UE 115 to save power and increase battery life by avoiding attempting to decode a message that the UE 115 does not have the capability to decode. Another implementation may allow a UE 115 to improve communicates reliability by transmitting messages that the UE 115 has determined that other UEs 115 are capable of decoding.

Figure 6:
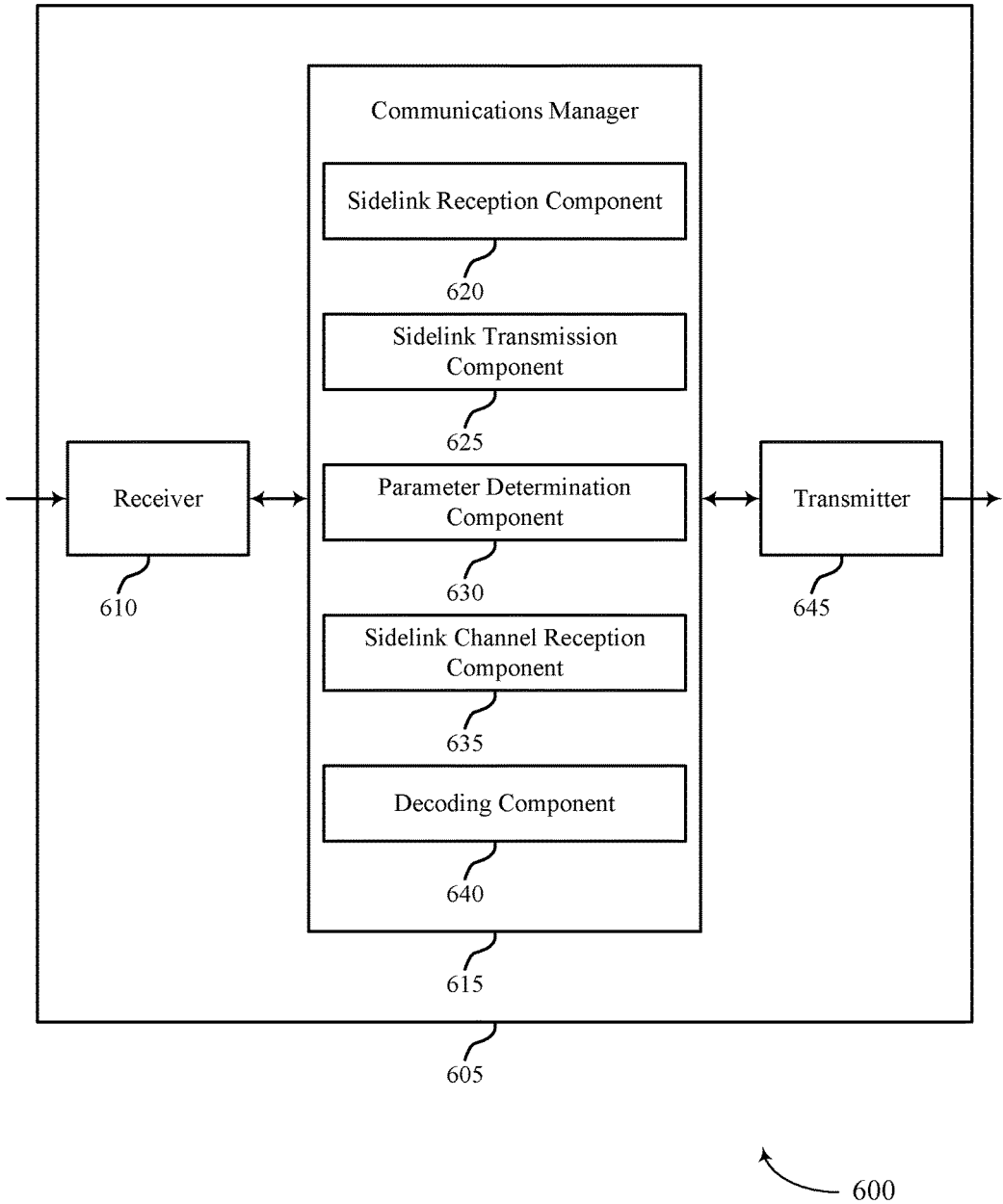

FIG. 6 shows a block diagram 600 of a device 605 that supports wireless device transmit and receive capability in sidelink control information in accordance with aspects of the present disclosure. The device 605 may be an example of aspects of a device 505, or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to wireless device transmit and receive capability in sidelink control information, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a sidelink reception component 620, a sidelink transmission component 625, a parameter determination component 630, a sidelink channel reception component 635, and a decoding component 640. The communications manager 615 may be an example of aspects of the communications manager 810 described herein.

The sidelink reception component 620 may receive, in a sidelink communication message, an indication of a receive category of a second wireless device, the receive category indicating a receive parameter of the second wireless device.

The sidelink transmission component 625 may transmit a shared sidelink channel message to the second wireless device based on the receive category of the second wireless device.

The sidelink reception component 620 may receive, in a sidelink communication message, an indication of a transmit category of a second wireless device, the transmit category indicating a transmit parameter of the second wireless device.

The parameter determination component 630 may determine, based on the indication, that the transmit parameter of the second wireless device is greater than a receive parameter of the first wireless device, where the receive parameter is based on a receive category of the first wireless device.

The sidelink channel reception component 635 may receive a shared sidelink channel message.

The decoding component 640 may determine to refrain from decoding the shared sidelink channel message based on determining that the transmit parameter of the second wireless device is greater than the receive parameter of the first wireless device.

The sidelink reception component 620 may receive, in a sidelink communication message, an indication of a transmit category of a second wireless device, the transmit category indicating a transmit parameter of the second wireless device.

The parameter determination component 630 may determine, based on the indication, that the transmit parameter of the second wireless device is lower than or equal to a receive parameter of the first wireless device, where the receive parameter is based on a receive category of the first wireless device.

The sidelink channel reception component 635 may receive a shared sidelink channel message.

The decoding component 640 may determine to decode the shared sidelink channel message based on determining that the transmit parameter of the second wireless device is lower than or equal to the receive parameter of the first wireless device.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

A processor of a UE 115 (e.g., controlling the receiver 610, the transmitter 650, or a transceiver 820 as described with reference to FIG. 8) may operate the components described herein to realize one or more potential advantages. For example, a processor of a UE 115 may operate receiver 610 to receive a transmit category of another UE 115, and receiver a sidelink message from another UE 115. The processor of the UE 115 may operate components to determine whether to decode the sidelink message. In another example, the processor of the UE 115 may operate transmitter 650 to transmit a transmit or receive categories to one or more other UEs 115. Another UE 115 may utilize the receive category to determine a transmission configuration of a sidelink message to another UE 115. Thus, UEs 115 may save power and improve communications reliability by transmitting messages that other UEs 115 are determined to be capable of decoding, or by determining not to attempt to decode message that the UE 115 does not have the capability to decode.

Figure 7:
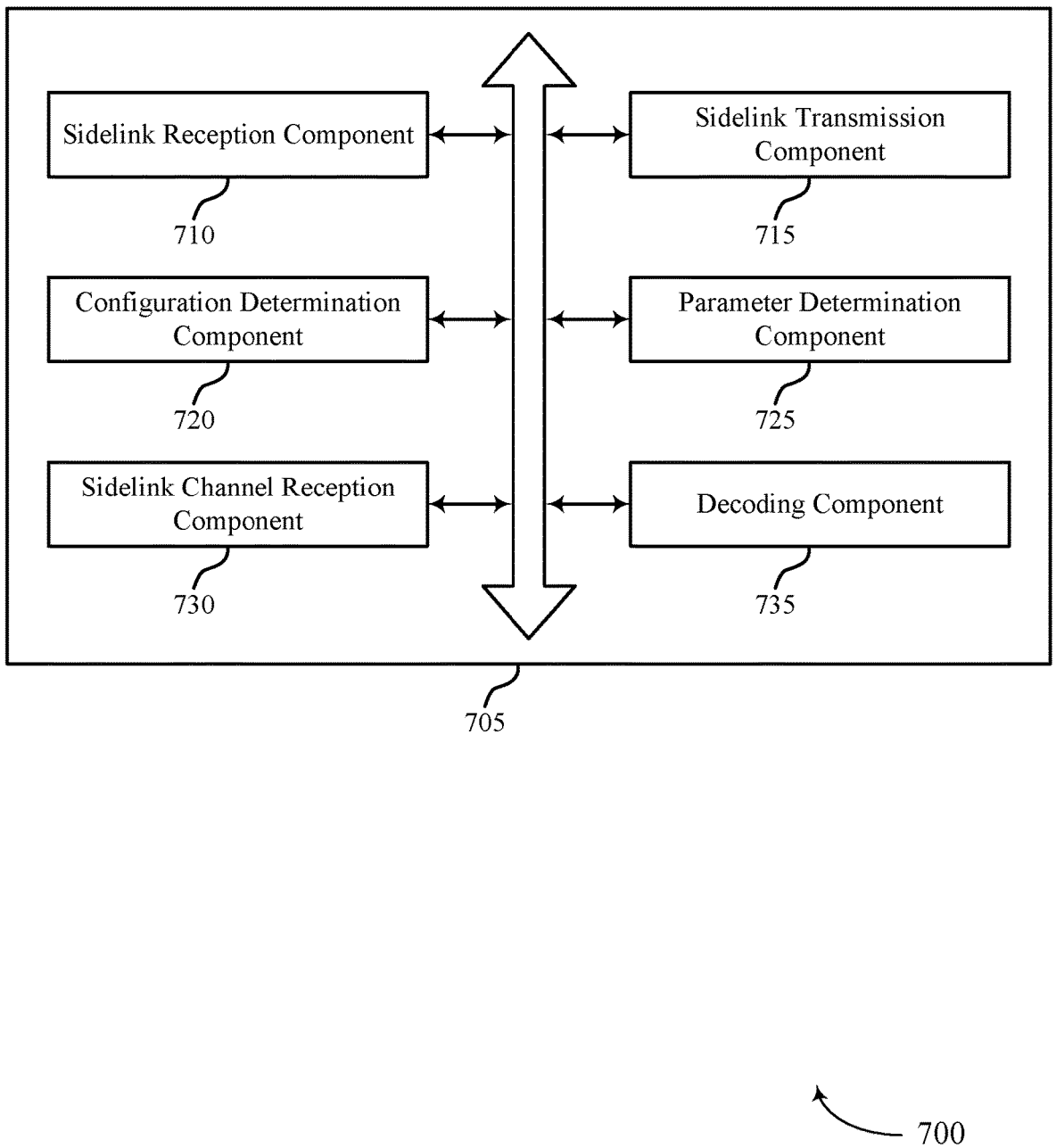
FIG. 7 shows a block diagram of a communications manager that supports wireless device transmit and receive capability in sidelink control information in accordance with aspects of the present disclosure.

FIG. 7 shows a block diagram 700 of a communications manager 705 that supports wireless device transmit and receive capability in sidelink control information in accordance with aspects of the present disclosure. The communications manager 705 may be an example of aspects of a communications manager 515, a communications manager 615, or a communications manager 810 described herein. The communications manager 705 may include a sidelink reception component 710, a sidelink transmission component 715, a configuration determination component 720, a parameter determination component 725, a sidelink channel reception component 730, and a decoding component 735. Each of these modules may communicate, directly or indirectly, with one another (e.g., via one or more buses).

The sidelink reception component 710 may receive, in a sidelink communication message, an indication of a receive category of a second wireless device, the receive category indicating a receive parameter of the second wireless device.

In some examples, the sidelink reception component 710 may receive, in a sidelink communication message, an indication of a transmit category of a second wireless device, the transmit category indicating a transmit parameter of the second wireless device.

In some examples, the sidelink reception component 710 may receive, in a sidelink communication message, an indication of a transmit category of a second wireless device, the transmit category indicating a transmit parameter of the second wireless device.

In some cases, the sidelink communication message includes a physical sidelink control channel message.

In some cases, the sidelink communication message includes a sidelink control information message.

In some cases, the receive parameter is a number of bits that the second wireless device is capable of receiving within a transmission time interval, where the number of bits is a number of sidelink shared channel transport block bits or a number of bits of a sidelink shared channel transport block.

In some cases, the receive parameter includes a number of supported soft channel bits.

In some cases, the sidelink communication message includes a physical sidelink control channel message.

In some cases, the sidelink communication message includes a sidelink control information message.

In some cases, the transmit parameter is a number of bits that the first wireless device is capable of transmitting within a transmission time interval.

In some cases, the number of bits is a number of transport block bits.

In some cases, the number of bits that the second wireless device is capable of transmitting within a transmission time interval includes a number of sidelink shared channel transport block bits the second wireless device is capable of transmitting within a transmission time interval or a number of bits of a sidelink shared channel transport block the second wireless device is capable of transmitting within a transmission time interval.

In some cases, the sidelink communication message includes a broadcast message.

The sidelink transmission component 715 may transmit a shared sidelink channel message to the second wireless device based on the receive category of the second wireless device.

In some examples, the sidelink transmission component 715 may transmit the shared sidelink channel message based on the determined segmentation, the MCS, and the resource block configuration.

In some cases, the transmit category indicates a variable transmit category based on a communication configuration.

In some cases, the sidelink communication message includes a broadcast message.

The parameter determination component 725 may determine, based on the indication, that the transmit parameter of the second wireless device is greater than a receive parameter of the first wireless device, where the receive parameter is based on a receive category of the first wireless device.

In some examples, the parameter determination component 725 may determine, based on the indication, that the transmit parameter of the second wireless device is lower than or equal to a receive parameter of the first wireless device, where the receive parameter is based on a receive category of the first wireless device.

In some cases, the receive parameter is a number of bits that the second wireless device is capable of receiving within a transmission time interval.

In some cases, the number of bits is a number of transport block bits.

In some cases, the number of bits that the first wireless device is capable of receiving within a transmission time interval includes a number of sidelink shared channel transport block bits the first wireless device is capable of receiving within a transmission time interval or a number of bits of a sidelink shared channel transport block the first wireless device is capable of receiving within a transmission time interval.

In some cases, the receive parameter includes a number of supported soft channel bits.

In some cases, the transmit parameter includes a number of supported layers for spatial multiplexing by the second wireless device.

In some cases, the receive parameter is a number of bits that the first wireless device is capable of receiving within a transmission time interval.

In some cases, the number of bits is a number of transport block bits.

In some cases, the number of bits that the first wireless device is capable of receiving within a transmission time interval includes a number of sidelink shared channel transport block bits the first wireless device is capable of receiving within a transmission time interval or a number of bits of a sidelink shared channel transport block the first wireless device is capable of receiving within a transmission time interval.

In some cases, the transmit parameter is a number of bits that the second wireless device is capable of transmitting within a transmission time interval.

In some cases, the number of bits that the second wireless device is capable of transmitting within a transmission time interval includes a number of sidelink shared channel transport block bits the second wireless device is capable of transmitting within a transmission time interval or a number of bits of a sidelink shared channel transport block the second wireless device is capable of transmitting within a transmission time interval.

The sidelink channel reception component 730 may receive a shared sidelink channel message.

In some examples, the sidelink channel reception component 730 may receive a shared sidelink channel message.

The decoding component 735 may determine to refrain from decoding the shared sidelink channel message based on determining that the transmit parameter of the second wireless device is greater than the receive parameter of the first wireless device.

In some examples, the decoding component 735 may determine to decode the shared sidelink channel message based on determining that the transmit parameter of the second wireless device is lower than or equal to the receive parameter of the first wireless device.

In some examples, the decoding component 735 may determine to decode the shared sidelink channel message based on the number of sidelink shared channel transport block bits the first wireless device is capable of receiving within a transmission time interval and the number of bits of a sidelink shared channel transport block the first wireless device is capable of receiving within a transmission time interval.

In some examples, the decoding component 735 may perform a reference signal power exclusion process or determining a code rate limit, or a combination thereof, based on the decoding.

The configuration determination component 720 may determine a segmentation, a MCS, and a resource block configuration based on the receive category of the second wireless device.

In some examples, the configuration determination component 720 may determine the MCS and the resource block configuration that do not exceed the receive category of the second wireless device.

In some examples, the configuration determination component 720 may determine the segmentation, the MCS, and the resource block configuration based on an algorithm, where the algorithm is based on a throughput calculation, a latency calculation, or a combination thereof.

Figure 8:
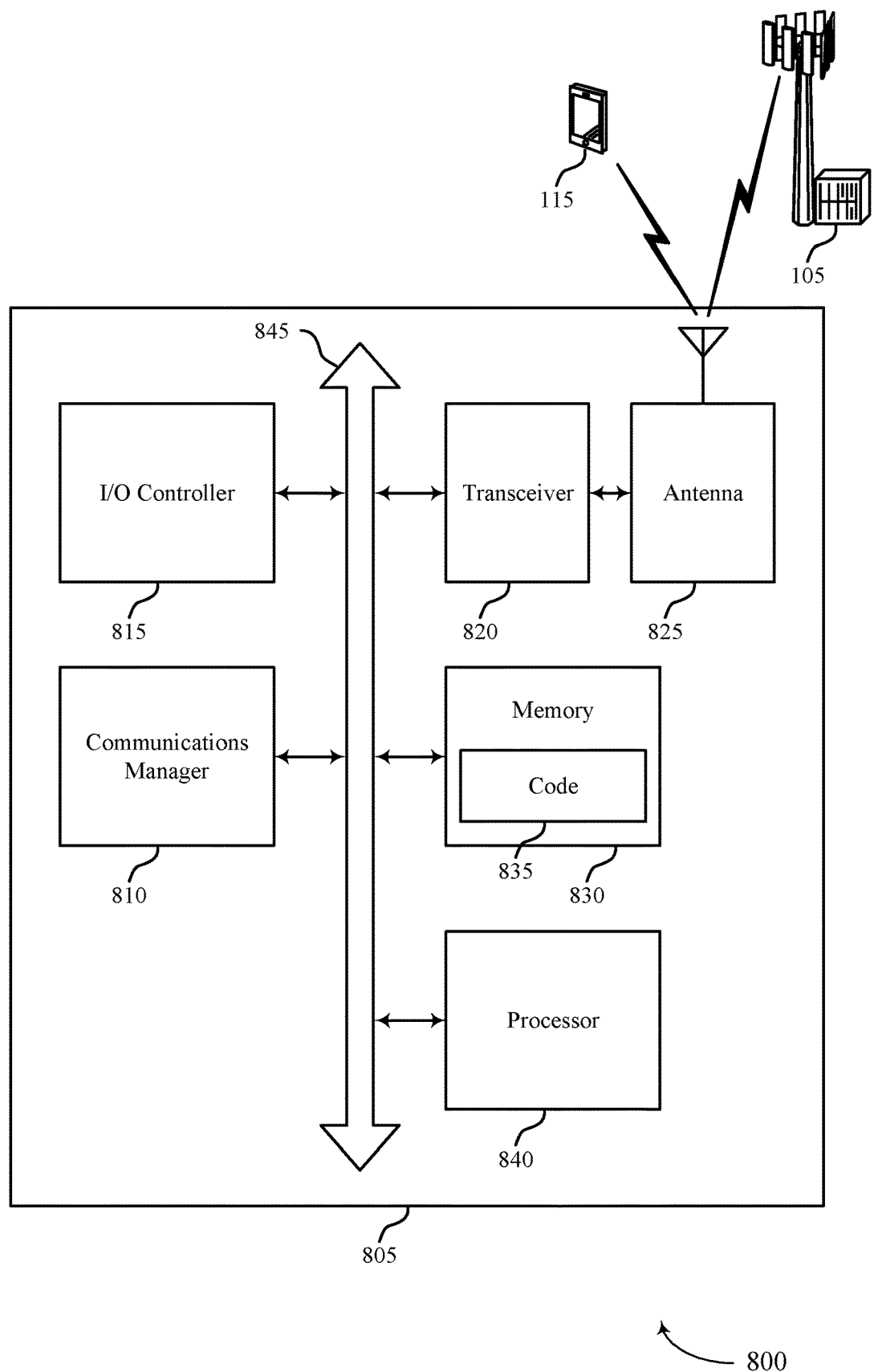
FIG. 8 shows a diagram of a system including a device that supports wireless device transmit and receive capability in sidelink control information in accordance with aspects of the present disclosure.

FIG. 8 shows a diagram of a system 800 including a device 805 that supports wireless device transmit and receive capability in sidelink control information in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, in a sidelink communication message, an indication of a receive category of a second wireless device, the receive category indicating a receive parameter of the second wireless device and transmit a shared sidelink channel message to the second wireless device based on the receive category of the second wireless device. The communications manager 810 may also receive, in a sidelink communication message, an indication of a transmit category of a second wireless device, the transmit category indicating a transmit parameter of the second wireless device, determine, based on the indication, that the transmit parameter of the second wireless device is greater than a receive parameter of the first wireless device, where the receive parameter is based on a receive category of the first wireless device, receive a shared sidelink channel message, and determine to refrain from decoding the shared sidelink channel message based on determining that the transmit parameter of the second wireless device is greater than the receive parameter of the first wireless device. The communications manager 810 may also receive, in a sidelink communication message, an indication of a transmit category of a second wireless device, the transmit category indicating a transmit parameter of the second wireless device, determine, based on the indication, that the transmit parameter of the second wireless device is lower than or equal to a receive parameter of the first wireless device, where the receive parameter is based on a receive category of the first wireless device, receive a shared sidelink channel message, and determine to decode the shared sidelink channel message based on determining that the transmit parameter of the second wireless device is lower than or equal to the receive parameter of the first wireless device.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver.

The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting wireless device transmit and receive capability in sidelink control information).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
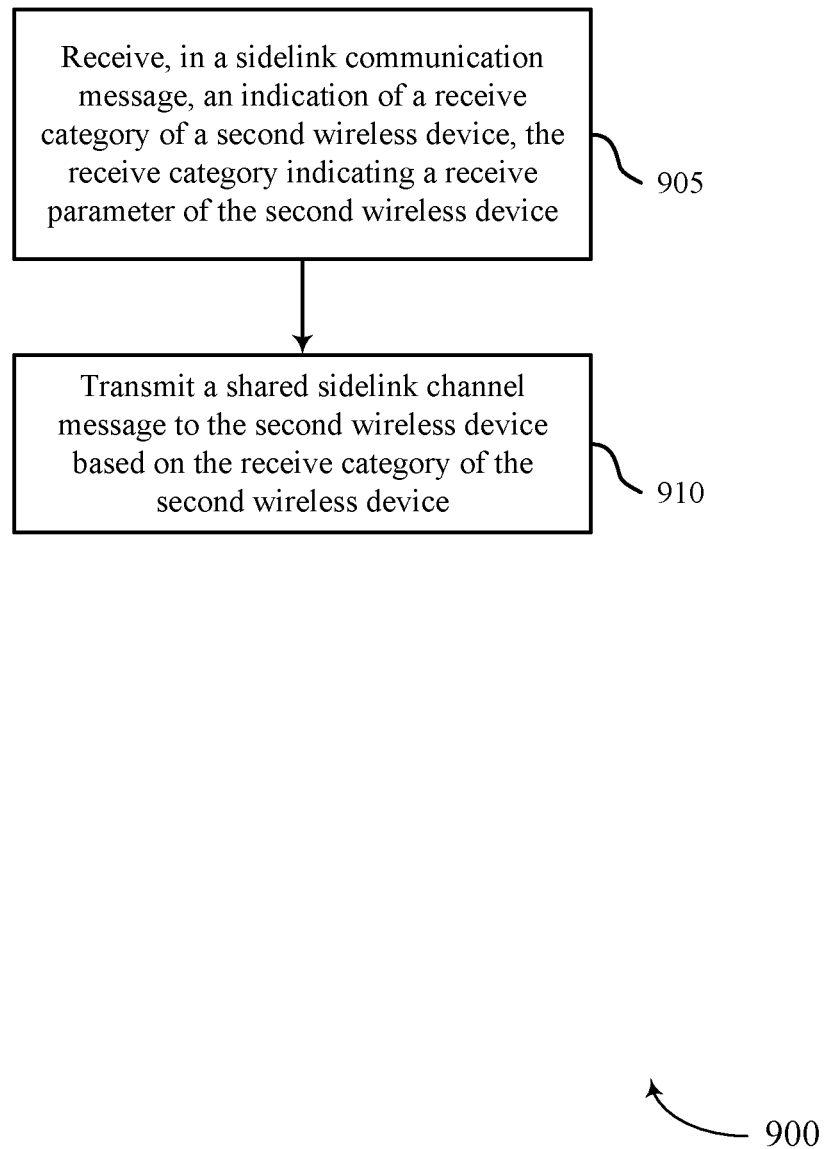
FIGS. 9 through 11 show flowcharts illustrating methods that support wireless device transmit and receive capability in sidelink control information in accordance with aspects of the present disclosure.

FIG. 9 shows a flowchart illustrating a method 900 that supports wireless device transmit and receive capability in sidelink control information in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive, in a sidelink communication message, an indication of a receive category of a second wireless device, the receive category indicating a receive parameter of the second wireless device. The operations of 905 may be performed according to the methods described herein. In some examples, aspects of the operations of 905 may be performed by a sidelink reception component as described with reference to FIGS. 5 through 8.

At 910, the UE may transmit a shared sidelink channel message to the second wireless device based on the receive category of the second wireless device. The operations of 910 may be performed according to the methods described herein. In some examples, aspects of the operations of 910 may be performed by a sidelink transmission component as described with reference to FIGS. 5 through 8.

Figure 10:
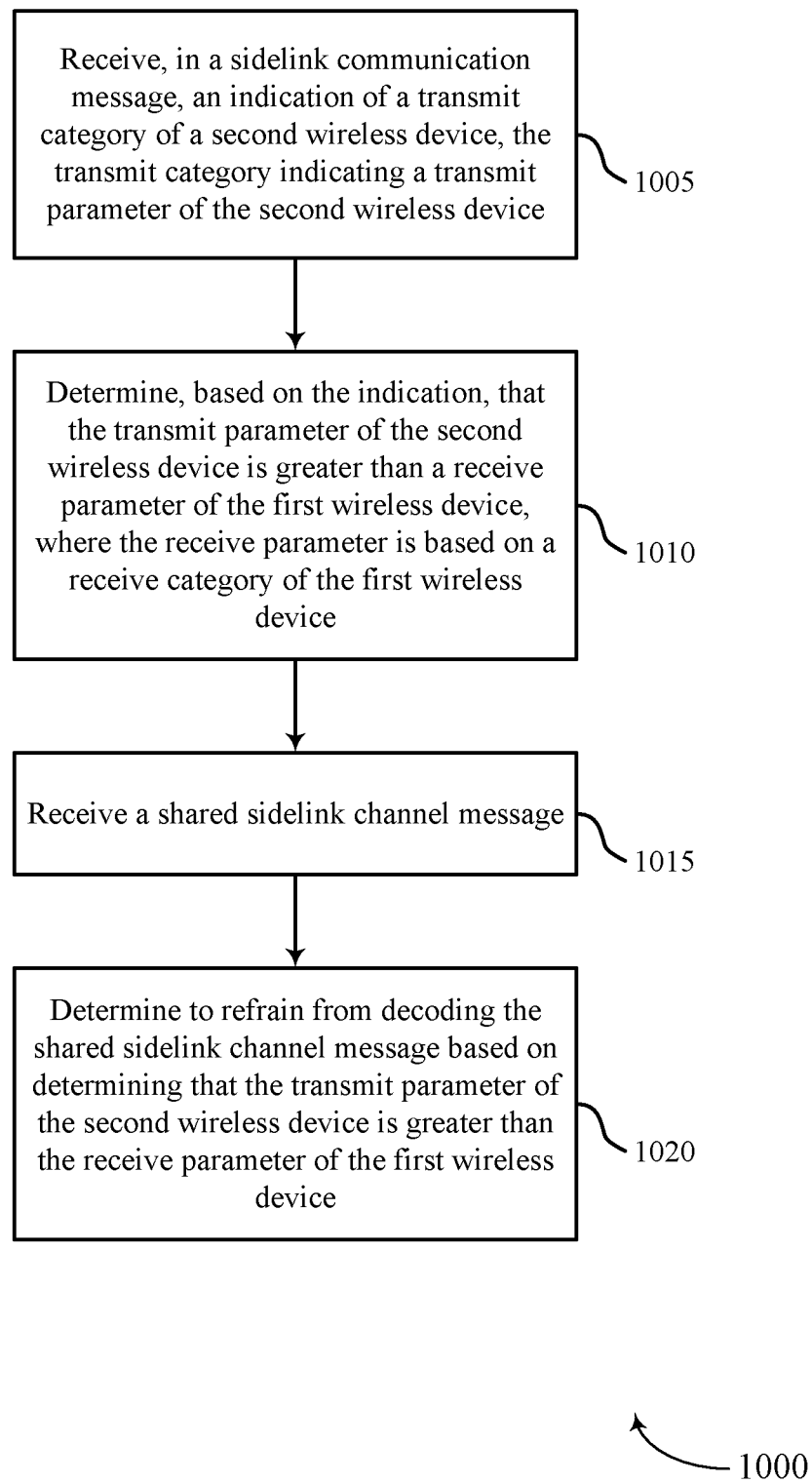

FIG. 10 shows a flowchart illustrating a method 1000 that supports wireless device transmit and receive capability in sidelink control information in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive, in a sidelink communication message, an indication of a transmit category of a second wireless device, the transmit category indicating a transmit parameter of the second wireless device. The operations of 1005 may be performed according to the methods described herein. In some examples, aspects of the operations of 1005 may be performed by a sidelink reception component as described with reference to FIGS. 5 through 8.

At 1010, the UE may determine, based on the indication, that the transmit parameter of the second wireless device is greater than a receive parameter of the first wireless device, where the receive parameter is based on a receive category of the first wireless device. The operations of 1010 may be performed according to the methods described herein. In some examples, aspects of the operations of 1010 may be performed by a parameter determination component as described with reference to FIGS. 5 through 8.

At 1015, the UE may receive a shared sidelink channel message. The operations of 1015 may be performed according to the methods described herein. In some examples, aspects of the operations of 1015 may be performed by a sidelink channel reception component as described with reference to FIGS. 5 through 8.

At 1020, the UE may determine to refrain from decoding the shared sidelink channel message based on determining that the transmit parameter of the second wireless device is greater than the receive parameter of the first wireless device. The operations of 1020 may be performed according to the methods described herein. In some examples, aspects of the operations of 1020 may be performed by a decoding component as described with reference to FIGS. 5 through 8.

Figure 11:
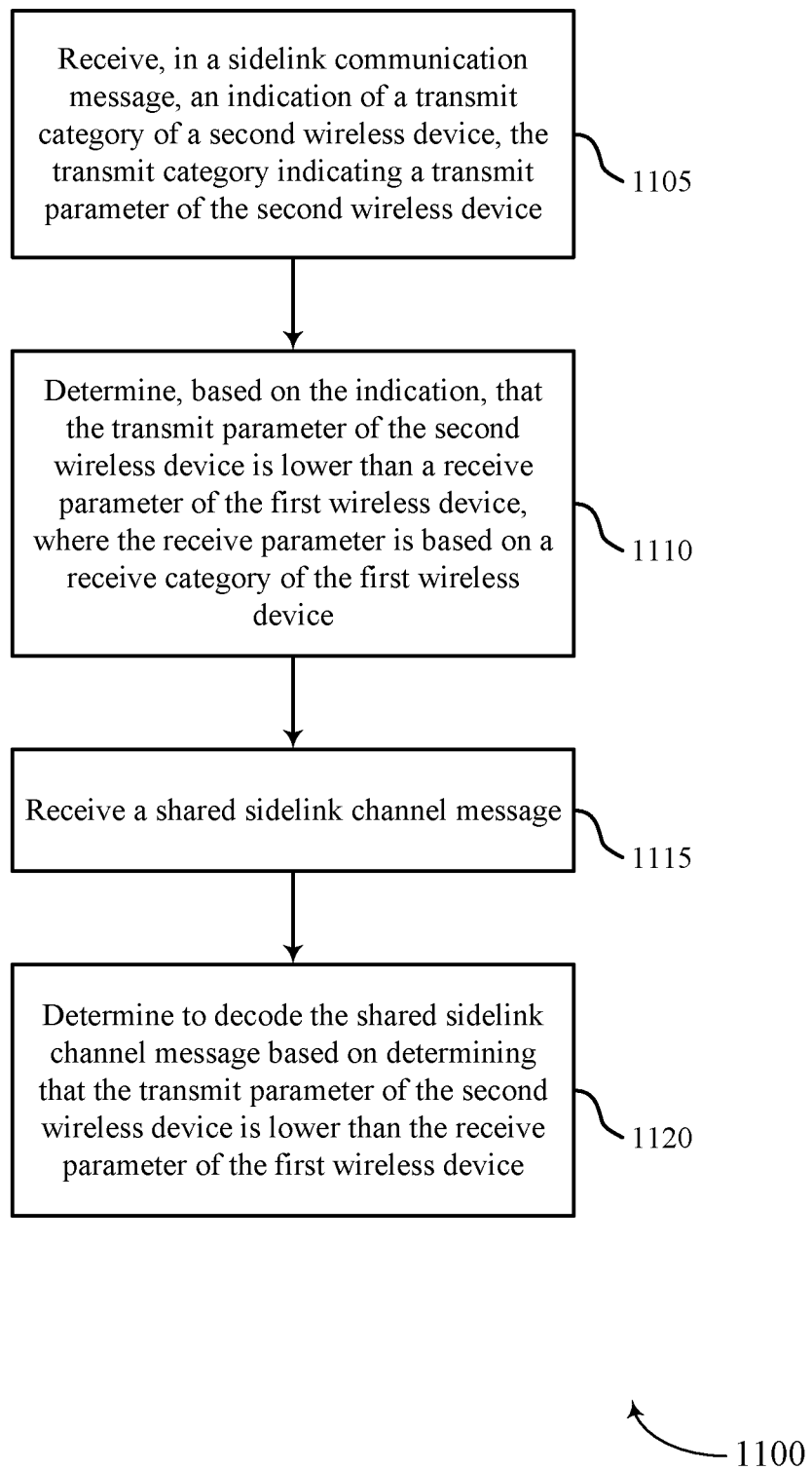

FIG. 11 shows a flowchart illustrating a method 1100 that supports wireless device transmit and receive capability in sidelink control information in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may receive, in a sidelink communication message, an indication of a transmit category of a second wireless device, the transmit category indicating a transmit parameter of the second wireless device. The operations of 1105 may be performed according to the methods described herein. In some examples, aspects of the operations of 1105 may be performed by a sidelink reception component as described with reference to FIGS. 5 through 8.

At 1110, the UE may determine, based on the indication, that the transmit parameter of the second wireless device is lower than or equal to a receive parameter of the first wireless device, where the receive parameter is based on a receive category of the first wireless device. The operations of 1110 may be performed according to the methods described herein. In some examples, aspects of the operations of 1110 may be performed by a parameter determination component as described with reference to FIGS. 5 through 8.

At 1115, the UE may receive a shared sidelink channel message. The operations of 1115 may be performed according to the methods described herein. In some examples, aspects of the operations of 1115 may be performed by a sidelink channel reception component as described with reference to FIGS. 5 through 8.

At 1120, the UE may determine to decode the shared sidelink channel message based on determining that the transmit parameter of the second wireless device is lower than or equal to the receive parameter of the first wireless device. The operations of 1120 may be performed according to the methods described herein. In some examples, aspects of the operations of 1120 may be performed by a decoding component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

The following examples are given by way of illustration. aspects of the following examples may be combined with aspects or embodiments shown or discussed in relation to the figures or elsewhere herein.

Example 1 is a method of wireless communication at a first wireless device that includes receiving, in a sidelink communication message, an indication of a receive category of a second wireless device, the receive category indicating a receive parameter of the second wireless device and transmitting a shared sidelink channel message to the second wireless device based on the receive category of the second wireless device.

In example 2, the method of example 1 further includes determining a segmentation, a MCS, and a resource block configuration based on the receive category of the second wireless device, and transmitting the shared sidelink channel message based on the determined segmentation, the MCS, and the resource block configuration.

In example 3, the method of any of examples 1-2 further includes determining the segmentation, the MCS, and the resource block configuration may include operations, features, means, or instructions for determining the MCS and the resource block configuration that do not exceed the receive category of the second wireless device.

In example 4, the method of any of examples 1-3 further includes determining the segmentation, MCS, and the resource block configuration may include operations, features, means, or instructions for determining the segmentation, the MCS, and the resource block configuration based on an algorithm, where the algorithm is based on a throughput calculation, a latency calculation, or a combination thereof In example 5, the method of any of examples 1-4 includes the sidelink communication message includes a physical sidelink control channel message.

In example 6, the method of any of examples 1-5 includes the sidelink communication message includes a sidelink control information message.

In example 7, the method of any of examples 1-6 includes the receive parameter may be a number of bits that the second wireless device may be capable of receiving within a transmission time interval, where the number of bits may be a number of sidelink shared channel transport block bits or a number of bits of a sidelink shared channel transport block.

In example 8, the method of any of examples 1-7 includes the receive parameter includes a number of supported soft channel bits.

In example 9, the method of any of examples 1-8 includes the sidelink communication message includes a broadcast message.

Example 10 is a system or apparatus including means for implementation a method or realizing an apparatus as in any of examples 1-9.

Example 11 is a non-transitory computer-readable medium storing instructions executable by one or more processors to cause the one or more processors to implement method as in any of examples 1-9.

Example 12 is a system including one or more processors and memory in electronic communication with the one or more processors storing instructions executable by the one or more processors to cause the system or apparatus to implement a method as in any of examples 1-9.

Example 13 is a method of wireless communication at a first wireless device that includes receiving, in a sidelink communication message, an indication of a transmit category of a second wireless device, the transmit category indicating a transmit parameter of the second wireless device, determining, based on the indication, that the transmit parameter of the second wireless device is greater than a receive parameter of the first wireless device, where the receive parameter is based on a receive category of the first wireless device, receiving a shared sidelink channel message, and determining to refrain from decoding the shared sidelink channel message based on determining that the transmit parameter of the second wireless device is greater than the receive parameter of the first wireless device.

In example 14, the method of example 13 includes the sidelink communication message includes a physical sidelink control channel message.

In example 15, the method of any of examples 13 or 14 includes the sidelink communication message includes a sidelink control information message.

In example 16, the method of any of examples 13-15 includes the receive parameter may be a number of bits that the second wireless device may be capable of receiving within a transmission time interval.

In example 17, the method of any of examples 13-16 includes the number of bits that the first wireless device may be capable of receiving within a transmission time interval includes a number of sidelink shared channel transport block bits the first wireless device may be capable of receiving within a transmission time interval or a number of bits of a sidelink shared channel transport block the first wireless device may be capable of receiving within a transmission time interval.

In example 18, the method of any of examples 13-17 includes the transmit parameter may be a number of bits that the first wireless device may be capable of transmitting within a transmission time interval.

In example 19, the method of any of examples 13-18 includes the number of bits may be a number of transport block bits.

In example 20, the method of any of examples 13-19 includes the number of bits that the second wireless device may be capable of transmitting within a transmission time interval includes a number of sidelink shared channel transport block bits the second wireless device may be capable of transmitting within a transmission time interval or a number of bits of a sidelink shared channel transport block the second wireless device may be capable of transmitting within a transmission time interval.

In example 21, the method of any of examples 13-20 includes the receive parameter includes a number of supported soft channel bits.

In example 22, the method of any of examples 13-21 includes the transmit parameter includes a number of supported layers for spatial multiplexing by the second wireless device.

In example 23, the method of any of examples 13-22 includes the sidelink communication message includes a broadcast message.

In example 24, the method of any of examples the transmit category indicates a variable transmit category based on a communication configuration.

Example 25 is a system or apparatus including means for implementing a method or realizing an apparatus as in any of examples 13-24.

Example 26 is a non-transitory computer-readable medium storing instructions executable by one or more processors to cause the one or more processors to implement a method as in any of examples 13-24.

Example 27 is a system including one or more processors and memory in electronic communication with the one or more processors storing instructions executable by the one or more processors to cause the system or apparatus to implement a method as in any of examples 13-24.

Example 28 is a method of wireless communications at a first wireless device that includes receiving, in a sidelink communication message, an indication of a transmit category of a second wireless device, the transmit category indicating a transmit parameter of the second wireless device, determining, based on the indication, that the transmit parameter of the second wireless device is lower than or equal to a receive parameter of the first wireless device, where the receive parameter is based on a receive category of the first wireless device, receiving a shared sidelink channel message, and determining to decode the shared sidelink channel message based on determining that the transmit parameter of the second wireless device is lower than or equal to the receive parameter of the first wireless device.

In example 29, the method of example 29 includes the receive parameter may be a number of bits that the first wireless device may be capable of receiving within a transmission time interval.

In example 30, the method of any of examples 28-29 includes the number of bits may be a number of transport block bits.

In example 31, the method of any of examples 28-30 includes the number of bits that the first wireless device may be capable of receiving within a transmission time interval includes a number of sidelink shared channel transport block bits the first wireless device may be capable of receiving within a transmission time interval or a number of bits of a sidelink shared channel transport block the first wireless device may be capable of receiving within a transmission time interval.

In example 32, the method of any of example 28-31 further includes determining to decode the shared sidelink channel message based on the number of sidelink shared channel transport block bits the first wireless device may be capable of receiving within a transmission time interval and the number of bits of a sidelink shared channel transport block the first wireless device may be capable of receiving within a transmission time interval.

In example 33, the method of any of examples 28-32 includes the transmit parameter may be a number of bits that the second wireless device may be capable of transmitting within a transmission time interval.

In example 34, the method of any of examples 28-33 includes the number of bits that the second wireless device may be capable of transmitting within a transmission time interval includes a number of sidelink shared channel transport block bits the second wireless device may be capable of transmitting within a transmission time interval or a number of bits of a sidelink shared channel transport block the second wireless device may be capable of transmitting within a transmission time interval.

In example 35, the method of any of examples 28-34 further includes decoding the shared sidelink channel message, and performing a reference signal power exclusion process or determining a code rate limit, or a combination thereof, based on the decoding.

Example 36 is a system or apparatus including means for implementing a method or realizing an apparatus as in any of examples 28-34.

Example 37 is a non-transitory computer-readable medium storing instructions executable by one or more processors to cause the one or more processors to implement a method as in any of examples 28-34.

Example 38 is a system including one or more processors and memory in electronic communication with the one or more processors storing instructions executable by the one or more processors to cause the system or apparatus to implement a method as in any of examples 28-34.

Aspects of these examples may be combined with aspects or embodiments disclosed in other implementations.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:
   receiving, in a sidelink communication message, an indication of a receive category of a second wireless device, the receive category indicating a receive parameter associated with a type or format of wireless communications capable of being received at the second wireless device;
   determining a segmentation, a modulation and coding scheme, and a resource block configuration of wireless communications capable of being received at the second wireless device based at least in part on the receive category and an algorithm, wherein the algorithm is based at least in part on a throughput calculation, a latency calculation, or a combination thereof; and
   transmitting a shared sidelink channel message to the second wireless device based at least in part on the receive category of the second wireless device, the segmentation, the modulation and coding scheme, and the resource block configuration.

2. The method of claim 1, wherein determining the segmentation, the modulation and coding scheme, and the resource block configuration comprises:
   determining the modulation and coding scheme and the resource block configuration that do not exceed the receive category of the second wireless device.

3. The method of claim 1, wherein the sidelink communication message comprises a physical sidelink control channel message.

4. The method of claim 3, wherein the sidelink communication message comprises a sidelink control information message.

5. The method of claim 1, wherein the receive parameter comprises a number of bits that the second wireless device is capable of receiving within a transmission time interval, wherein the number of bits is a number of sidelink shared channel transport block bits or a number of bits of a sidelink shared channel transport block.

6. The method of claim 1, wherein the receive parameter comprises a number of supported soft channel bits.

7. The method of claim 1, wherein the sidelink communication message comprises a broadcast message.

8. A method for wireless communications at a first wireless device, comprising:
   receiving, in a sidelink communication message, an indication of a transmit category of a second wireless device, the transmit category indicating a transmit parameter of the second wireless device, wherein the transmit category indicates a variable transmit category based at least in part on a communication configuration, wherein the first wireless device is associated with a first radio access technology and a second radio access technology, and wherein the variable transmit category comprises a first transmit category associated with the first radio access technology and a second transmit category associated with the second radio access technology;
   determining, based at least in part on the indication, that the transmit parameter of the second wireless device is greater than a receive parameter of the first wireless device, wherein the receive parameter is based at least in part on a receive category of the first wireless device;
   receiving a shared sidelink channel message; and
   determining to refrain from decoding the shared sidelink channel message based at least in part on determining that the transmit parameter of the second wireless device is greater than the receive parameter of the first wireless device.

9. The method of claim 8, wherein the sidelink communication message comprises a physical sidelink control channel message.

10. The method of claim 9, wherein the sidelink communication message comprises a sidelink control information message.

11. The method of claim 8, wherein the receive parameter is a number of bits that the second wireless device is capable of receiving within a transmission time interval.

12. The method of claim 11, wherein the number of bits that the first wireless device is capable of receiving within a transmission time interval comprises a number of sidelink shared channel transport block bits the first wireless device is capable of receiving within a transmission time interval or a number of bits of a sidelink shared channel transport block the first wireless device is capable of receiving within a transmission time interval.

13. The method of claim 8, wherein the transmit parameter is a number of bits that the first wireless device is capable of transmitting within a transmission time interval.

14. The method of claim 13, wherein the number of bits is a number of transport block bits.

15. The method of claim 13, wherein the number of bits that the second wireless device is capable of transmitting within a transmission time interval comprises a number of sidelink shared channel transport block bits the second wireless device is capable of transmitting within a transmission time interval or a number of bits of a sidelink shared channel transport block the second wireless device is capable of transmitting within a transmission time interval.

16. The method of claim 8, wherein the receive parameter comprises a number of supported soft channel bits.

17. The method of claim 8, wherein the transmit parameter comprises a number of supported layers for spatial multiplexing by the second wireless device.

18. The method of claim 8, wherein the sidelink communication message comprises a broadcast message.

19. A method for wireless communications at a first wireless device, comprising:
   receiving, in a sidelink communication message, an indication of a transmit category of a second wireless device, the transmit category indicating a transmit parameter of the second wireless device, wherein the transmit category indicates a variable transmit category based at least in part on a communication configuration, wherein the first wireless device is associated with a first radio access technology and a second radio access technology, and wherein the variable transmit category comprises a first transmit category associated with the first radio access technology and a second transmit category associated with the second radio access technology;
   determining, based at least in part on the indication, that the transmit parameter of the second wireless device is lower than or equal to a receive parameter of the first wireless device, wherein the receive parameter is based at least in part on a receive category of the first wireless device;
   receiving a shared sidelink channel message; and
   determining to decode the shared sidelink channel message based at least in part on determining that the transmit parameter of the second wireless device is lower than or equal to the receive parameter of the first wireless device.

20. The method of claim 19, wherein the receive parameter is a number of bits that the first wireless device is capable of receiving within a transmission time interval.

21. The method of claim 20, wherein the number of bits is a number of transport block bits.

22. The method of claim 20, wherein the number of bits that the first wireless device is capable of receiving within a transmission time interval comprises a number of sidelink shared channel transport block bits the first wireless device is capable of receiving within a transmission time interval or a number of bits of a sidelink shared channel transport block the first wireless device is capable of receiving within a transmission time interval.

23. The method of claim 22, further comprising:
   determining to decode the shared sidelink channel message based at least in part on the number of sidelink shared channel transport block bits the first wireless device is capable of receiving within a transmission time interval and the number of bits of a sidelink shared channel transport block the first wireless device is capable of receiving within a transmission time interval.

24. The method of claim 19, wherein the transmit parameter is a number of bits that the second wireless device is capable of transmitting within a transmission time interval.

25. The method of claim 24, wherein the number of bits that the second wireless device is capable of transmitting within a transmission time interval comprises a number of sidelink shared channel transport block bits the second wireless device is capable of transmitting within a transmission time interval or a number of bits of a sidelink shared channel transport block the second wireless device is capable of transmitting within a transmission time interval.

26. The method of claim 19, further comprising:
   decoding the shared sidelink channel message; and
   performing a reference signal power exclusion process or determining a code rate limit, or a combination thereof, based at least in part on the decoding.

27. An apparatus for wireless communication at a first wireless device, comprising:
   a processor;
   memory coupled with the processor; and
   instructions stored in the memory and executable by the processor to cause the apparatus to:
      receive, in a sidelink communication message, an indication of a receive category of a second wireless device, the receive category indicating a receive parameter associated with a type or format of wireless communications capable of being received at the second wireless device;
      determining a segmentation, a modulation and coding scheme, and a resource block configuration of wireless communications capable of being received at the second wireless device based at least in part on the receive category and an algorithm, wherein the algorithm is based at least in part on a throughput calculation, a latency calculation, or a combination thereof; and
      transmit a shared sidelink channel message to the second wireless device based at least in part on the receive category of the second wireless device, the segmentation, the modulation and coding scheme, and the resource block configuration.

* * * * *